Sept. 24, 1968

A. RIEDEL ET AL 3,403,220

CABLE GUIDING CHANNEL

Filed Oct. 21, 1966

INVENTORS.
ANTON RIEDEL &
HANS SCHIFFERLE

BY Adrian Medert

ATTORNEYS

Sept. 24, 1968  A. RIEDEL ET AL  3,403,220
CABLE GUIDING CHANNEL
Filed Oct. 21, 1966  2 Sheets-Sheet 2

INVENTORS.
ANTON RIEDEL &
HANS SCHIFFERLE
BY Adrian Medert
ATTORNEYS

United States Patent Office 3,403,220
Patented Sept. 24, 1968

3,403,220
CABLE GUIDING CHANNEL
Anton Riedel, 64 Zugspitzstrasse, 8035 Gauting, near Munich, Germany, and Hans Schifferle, 130, Aindorferstrasse, 42 Munich, Germany
Filed Oct. 21, 1966, Ser. No. 588,477
Claims priority, application Germany, Oct. 25, 1965, R 41,807
9 Claims. (Cl. 174—101)

ABSTRACT OF THE DISCLOSURE

The cable guiding channel of the present invention embodies a vertically extending assembly wall, parallel top and bottom walls projecting outwardly from the assembly wall along its longitudinal top and bottom edges, respectively, spaced front wall portions extending upwardly from the bottom wall and terminating short of the top wall, removable members for connecting and disconnecting the upper edges of the front wall portions to the top wall to provide access to the channel for adding or removing cables after the latter has been mounted. The front wall portions may be removable and slidable longitudinally of the channel.

---

Figure 1:
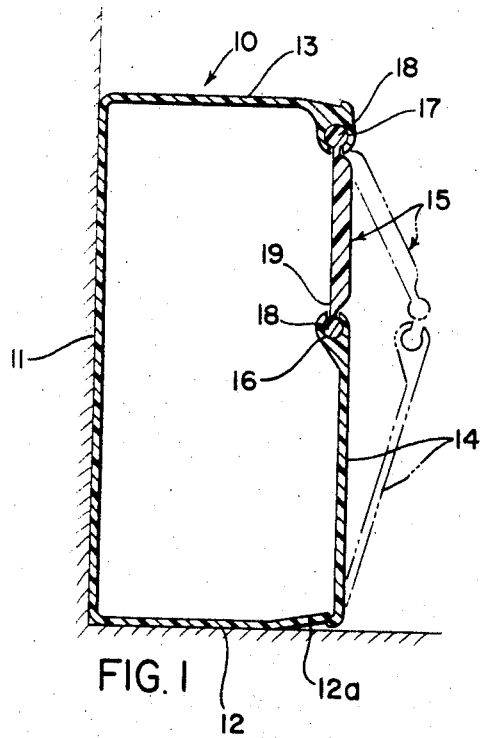

This invention relates to an improved cable guiding channel which is so constructed that the cable may be inserted therein along its entire length without disassembly of the units comprising the channel guide. More particularly, this invention relates to a conduit or guide for electrical cable and the like which is substantially channel-like in cross section with a longitudinal opening along its entire length so that a cable may be easily inserted therein or removed therefrom at any point throughout its extent.

Cable guides are usually mounted on walls, floors, or ceilings and serve to receive and protect electric cables and the like, from damage or becoming an obstruction. An initial insertion of the cable into the guide or conduit is relatively simple, however, problems arise when at a later date it is desired to service the cable or to insert additional cable into the same guide. Because most cable guides are rectangular in cross section, it is necessary to substantially disassemble the guide when an additional cable is placed therein. That is, it is usually required to remove sections of the guide, with the accompanying labor and time consumption. The practice of inserting cables in existing cable guides by threading it therethrough is an expensive, tedious, ofttimes impossible task, because of the bends and turns in the guide when mounted on the supporting surface.

The present invention overcomes the problems heretofore experienced in adding additional cables to an existing cable guide. In order to accomplish this end, a cable guide, usually formed of a suitable plastic material and having a channel shape, is provided with a continuous longitudinal slot through one of the walls, thus exposing the interior of the channel. A cable guiding channel made in accordance with the present invention includes an assembly wall which is usually affixed to a supporting surface. A top wall or top side and a bottom wall or bottom side are attached to, respectively, the upper and lower longitudinal edges of the assembly wall. The top and bottom walls extend outwardly from the assembly wall in parallel relation to each other. Spaced front wall portions extend upwardly from the outer edge of the bottom side parallel to the assembly wall. These wall portions are not coextensive with the height of the assembly wall, terminating at a point spaced therefrom. The space between the upper edge of the front section and the top wall provides a longitudinal opening through which cables may be inserted along the entire extent of the guide either at the time of initial assembly or at a later time when it is desired to insert additional cables. Once cables have been inserted into the guide, removable connecting members are positioned between the several front wall portions and the top wall and serve to maintain the cables within the guide.

The connecting members may be either inserted or snapped into place between the front wall portions and the top wall. Both ends of the connecting members usually have a type of tongue which engages within a longitudinal groove on the front wall portions and the outer edge of the top wall. This tongue and groove connection may take any desired configuration.

In this manner the present cable guide provides for the support of an arbitrary number of cables by inserting them over the front wall members into the guide. By means of the channel of the present invention the mounting of cables around inner and outer corners is greatly simplified. After the connecting members are secured the channel may be covered against dust in any suitable manner.

To separate cables which have different electrical potential, or for any other reason, the channel may be subdivided into two or more longitudinal cells. For this purpose, opposed longitudinal extending channel-shaped slots are formed along the surface of the assembly wall and the spaced front wall portions and connecting members in order that separating walls may be inserted and supported in the slots to separate the cables.

It is among the objects of this invention to provide a new and improved cable guiding channel.

It is a further object of this invention to provide a cable guiding channel wherein the insertion of additional cables into the channel may be accomplished with the minimum amount of time and labor.

It is a still further object of this invention to provide a cable guide of generally channel shape made of a plastic material, and having a longitudinal opening along its entire length through which cables may be easily and efficiently inserted or removed.

Figure 2:
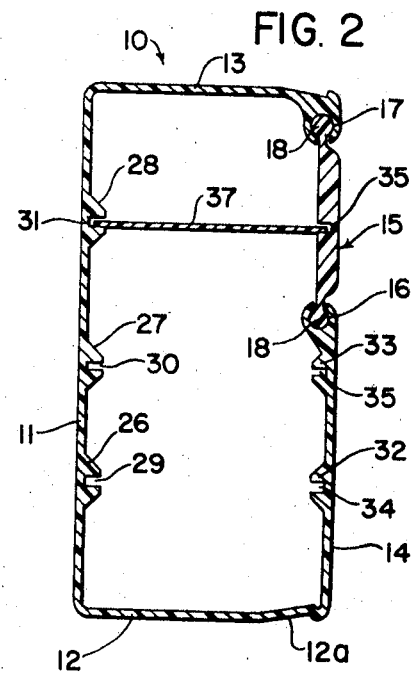
Figure 3:
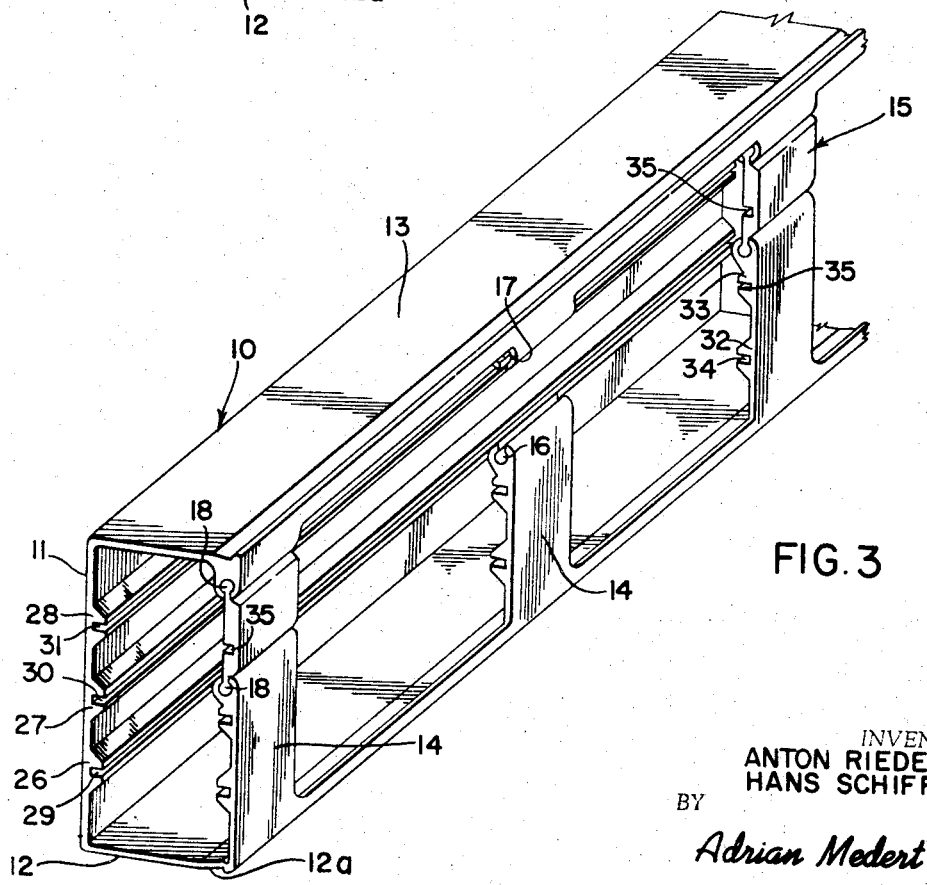
Figure 4:
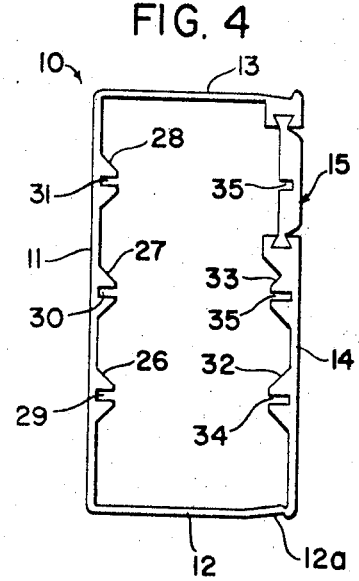
Figure 5:
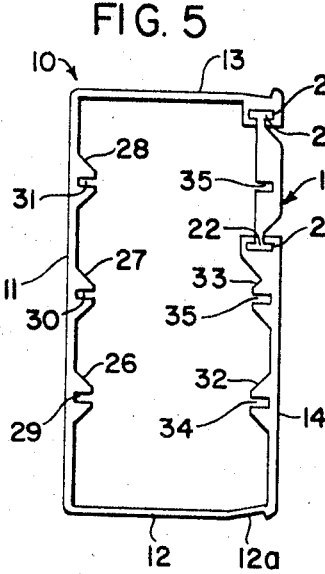
Figure 6:
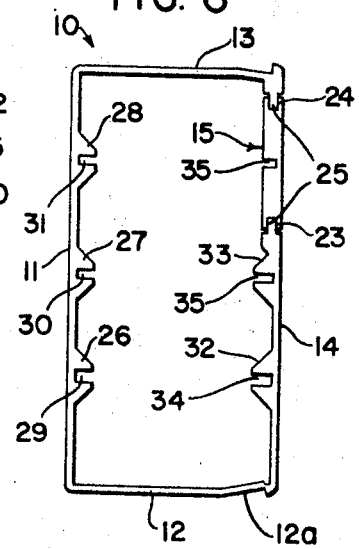
Figure 7:
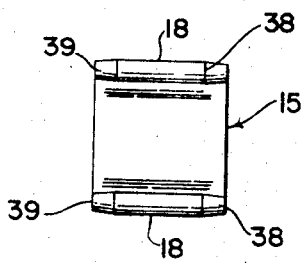
Figure 8:
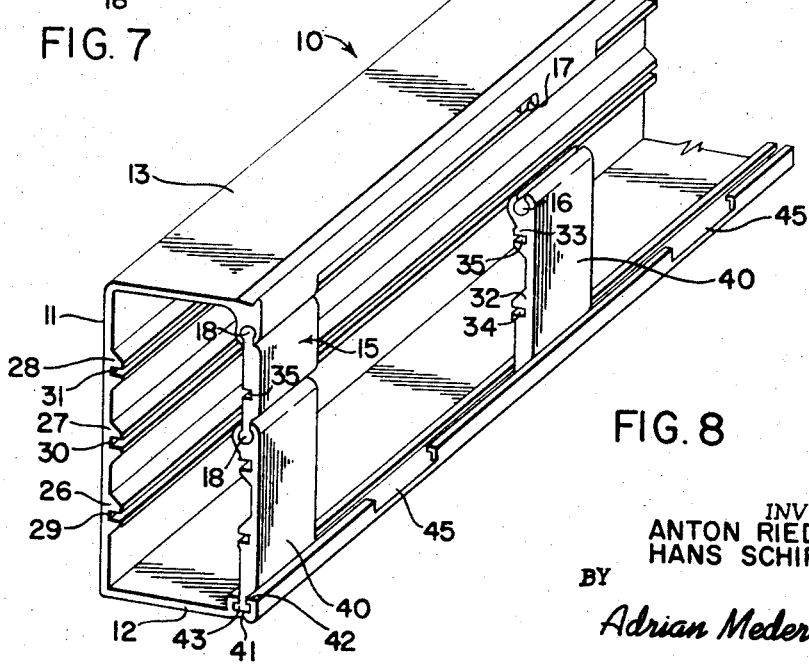

These and other objects, uses and advantages of the invention, not at this time more particularly pointed out, will become apparent to those skilled in the art as the nature of the invention is better understood from the following detailed description thereof taken in conjunction with the accompanying drawings, wherein like reference characteristics denote corresponding parts throughout the several views, and wherein:

FIGURE 1 is a cross sectional view of a cable guide made in accordance with the teachings of the present invention, FIGURE 2 is a cross sectional view of the cable guide of the present invention showing sub-division of the guide into several longitudinal compartments, FIGURE 3 is a perspective view showing the channel with the front wall portions and connecting members in assembled relation, FIGURES 4, 5 and 6 indicate cross sectional views of the various joint constructions between the connecting members and the front wall portion and the top wall, FIGURE 7 illustrates the connecting member, and FIGURE 8 is a perspective view illustrating a modification of the present invention wherein the front wall portions have a slidable connection along the outer edge portion of the bottom side of the channel.

Referring now to the drawings, and more particularly to FIGURES 1 through 6, there is illustrated a preferred form of cable guide channel constructed in accordance with the present invention, generally indicated at 10, and including an assembly wall 11, which may be attached to any suitable supporting surface to position the guiding channel in the desired location. An outwardly extending bottom wall 12 is integrally formed with the bottom edge portion of the assembly wall 11. Similarly, an outwardly extending top wall 13 projects from the top edge portion of the assembly wall 11 and is generally parallel to the bottom wall 12. The bottom wall 12 may have an upturned edge portion 12a on which spaced upwardly extending wall portions 14 are mounted. The front wall portions 14 are generally parallel to the assembly wall 11 but are not coextensive therewith in height, terminating at a point spaced from the outer edge of the top wall 13. The opening between the top wall 13 and the upper extremities of wall portions 14 forms a longitudinal path through which a cable may be inserted into the guiding channel 10. Once a cable has been inserted into the guiding channel 10 the longitudinal path opening is interrupted by means of spaced connecting members 15. The connecting members 15 (FIGURE 7) usually are rectangular in shape and are provided with connecting means along their top and bottom edge portions to facilitate insertion into the space between the top wall 13 and the front wall members 14 as explained more fully hereinafter.

The connecting members 15 are held in position by means of longitudinal slots or grooves 16 and 17 formed along the top edge of wall portions 14 and the outer edge of the top wall 13, respectively. The slots or grooves 16 and 17 may take various configurations as illustrated in FIGURES 1 and 4 through 6, inclusive. As shown in FIGURE 1 the slot has a generally circular cross section with an opening therein through which part of the member 15 may pass. The member 15 has complemental tongues or guides 18 formed on the longitudinal edges thereof to engage within the slots 16 and 17 of the member 14 and top wall 13, respectively. As shown in FIGURE 1 the guides on the members 15 are generally circular in cross section and are attached to the body of the member 15 by a narrow neck portion 19. It is the neck portion 19 which engages in the open portion of the slots 16 and 17. Moreover, because of the natural resiliency of the wall portion 14 and the material of which slots 16 and 17 are formed the connecting member 15 may be snapped into position by forcing the enlarged guides 18 into the slots 16 and 17 (FIGURE 1). As illustrated in FIGURES 4, 5 and 6, the slots 16 and 17 as well as the guides 18 may be dovetail shaped (FIGURE 3), T-shaped (FIGURE 4) or merely rectangular shaped (FIGURE 6). As shown in FIGURE 6 the tongue or guide may be formed on the upper edge portion of the member 14 and the slot or groove provided on the edges of the connecting members. In other words, the function or structure of the connecting members and slots may be reversed. In FIGURE 5 the slots are represented by the numerals 20 and 21 and the guides as 22, and in FIGURE 6 the slots or grooves are designated numbers 23 and 24 and the guide as 25.

In some instances it is desirable that the cables be separated from each other within the guiding channel. This is especially the case where cables carrying different amounts of current and having different electrical potentials are mounted in the same guiding channel. The present invention provides for this contingency by means of spaced projections 26, 27 and 28, integrally formed on the assembly wall 11 and longitudinally slotted as at 29, 30 and 31. Opposed to the projections 26 and 27 on the wall 11, the front wall portions 14 have integrally formed therewith similar projections 32 and 33, respectively. These projections 32 and 33 are provided with longitudinal slots 34 and 35 which are in horizontal alignment with the slots 29 and 30. Similarly, in alignment with the slot 31 the connecting members 15 are formed with a channel 35 merely by cutting a slot into the inner surface of the connecting member 15. It is then a simple matter to insert a separator 37 along the opposing slots and thereby support separate cables.

With reference to FIGURE 7 there is shown a front view of the connecting member 15. The tongues or guides 18 are shown with bevelled ends 38 and 39 to facilitate insertion thereof into the slots of the front wall portion and the top side of the channel assembly.

An alternate configuration for a front wall portion is shown in FIGURE 8. As illustrated the wall portion 40 is provided with a tongue or guide along its bottom length similar to that used on the connecting member 15 (FIGURE 5). A groove 41 may also be formed along the outer edge of the bottom wall 12. The groove 41 faces in an upward direction and has opposing inwardly directed flanges 42 to secure the tongue 43 of the member 40. Openings 45 are provided along the outer wall of the groove 41 to facilitate insertion of the wall portions 40 into the groove so that they may be slid along its length. It is of course anticipated that various configurations may be used in the tongue and groove design, as explained with reference to a similar configuration on the connecting member 15.

While there has been described herein and illustrated in the accompanying drawings a presently preferred embodiment of the present invention, it is to be understood that various modifications and refinements which depart from the illustrated embodiment may be adopted without departing from the spirit and scope of the invention.

We claim:

1. A channel shaped cable guide comprising an assembly wall, an outwardly extending top wall on said assembly wall at its uppermost portion, an outwardly extending bottom wall on said assembly wall at its bottom portion, front wall portions opposed to side assembly wall extending upwardly from said bottom wall at spaced intervals along its length, said portions extending upwardly a distance less than the height of said assembly wall, and removable wall members for connecting and disconnecting said front wall portions with said top wall.

2. The cable guide of claim 1 wherein said spaced front wall portions are integral with said bottom side and have a longitudinal slot along their uppermost edge portion.

3. The cable guide of claim 2 wherein said removable wall members for connecting the front wall portions with the top wall include an element having a longitudinal guide along its bottommost length in order that it may fit into and slide along said longitudinal slot in said front wall portion.

4. The cable guide of claim 3 wherein downwardly directed longitudinal slots are formed on said top wall, said downwardly directed slots being positioned at intervals corresponding to the intervals of the front wall portions along the length of said cable guide, and longitudinal guides on the upper portion of said removable wall members which may be inserted and secured by said slots on said top side.

5. The cable guide of claim 4 wherein said guides and slot are dovetail shaped.

6. The cable guide of claim 4 wherein said guides and said slots are T-shaped.

7. The cable guide of claim 4 wherein said guide and said slots have a circular cross section.

8. The cable guide of claim 1 wherein said front wall portions are removable and slidably engaged with said bottom wall.

9. The cable guide of claim 8 wherein said bottom wall has an upwardly directed slot at its outer edge and said front wall portions have means at the bottom edge thereof for sliding along said slot while being secured therein, said slot having sections removed from one of its sides so that said removable front wall portions may be inserted into said slot.

References Cited

UNITED STATES PATENTS

| | | | |
|---|---|---|---|
| 378,561 | 2/1888 | Waring | 138—115 X |
| 3,088,055 | 4/1963 | Schwing | 174—72 |
| 3,156,765 | 11/1964 | Weiss | 174—68 |

FOREIGN PATENTS

| | | |
|---|---|---|
| 213,995 | 3/1961 | Austria. |
| 1,337,949 | 8/1963 | France. |
| 881,995 | 11/1961 | Great Britain. |

LARAMIE E. ASKIN, *Primary Examiner.*